US011528525B1

(12) United States Patent
Mahyar et al.

(10) Patent No.: US 11,528,525 B1
(45) Date of Patent: Dec. 13, 2022

(54) AUTOMATED DETECTION OF REPEATED CONTENT WITHIN A MEDIA SERIES

(71) Applicant: Amazon Technologies, Inc., Seattle, WA (US)

(72) Inventors: Hooman Mahyar, Los Angeles, CA (US); Ryan Barlow Dall, Los Angeles, CA (US); Moussa El Chater, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 629 days.

(21) Appl. No.: 16/052,483

(22) Filed: Aug. 1, 2018

(51) Int. Cl.
| | |
|---|---|
| G06K 9/62 | (2022.01) |
| G06N 3/02 | (2006.01) |
| H04N 21/845 | (2011.01) |
| G06F 16/70 | (2019.01) |
| H04N 21/432 | (2011.01) |
| H04N 21/472 | (2011.01) |
| H04N 21/6587 | (2011.01) |

(52) U.S. Cl.
CPC ....... *H04N 21/4325* (2013.01); *G06K 9/6215* (2013.01); *G06N 3/02* (2013.01); *H04N 21/47217* (2013.01); *H04N 21/6587* (2013.01); *H04N 21/8456* (2013.01); *G06F 16/70* (2019.01)

(58) Field of Classification Search
CPC ............ G06F 16/70; G06F 16/71; G06N 3/02
USPC ................. 382/190, 192, 195, 206, 209–210
See application file for complete search history.

(56) References Cited

U.S. PATENT DOCUMENTS

| | | |
|---|---|---|
| 5,432,455 A | 7/1995 | Blades |
| 7,796,794 B2 | 9/2010 | Beyrard |
| 8,014,575 B2 | 9/2011 | Weiss et al. |
| 8,023,758 B2 | 9/2011 | Hung et al. |
| 8,077,917 B2 | 12/2011 | Forsgren |
| 8,374,388 B2 | 2/2013 | Stolkin et al. |
| 9,116,995 B2 | 8/2015 | Koperski et al. |
| 9,137,568 B2 * | 9/2015 | Sinha ................ H04N 21/4532 |
| 9,961,403 B2 | 5/2018 | Kritt et al. |
| 10,423,660 B1 | 9/2019 | Heo et al. |
| 10,455,297 B1 | 10/2019 | Mahyar et al. |
| 10,671,854 B1 | 6/2020 | Mahyar et al. |

(Continued)

FOREIGN PATENT DOCUMENTS

WO    WO-2013164817 A1 *  11/2013   ........... H04N 21/812

OTHER PUBLICATIONS

Office Action for U.S. Appl. No. 16/127,052, dated Sep. 3, 2020, Dall, "Automated Detection of Static Content Within Media Items," 32 Pages.

*Primary Examiner* — Claire X Wang
*Assistant Examiner* — Stephen M Brinich
(74) *Attorney, Agent, or Firm* — Lee & Hayes, P.C.

(57) ABSTRACT

This disclosure is directed to a system and method that automatically detects repeated content within multiple media items. Content providers often include content, such as an introduction, near the beginning of a media item. In some circumstances, such as in the case of a series of television episodes, the content providers use the same content in each episode of the series. By dividing the media items into portions and analyzing the portions, the systems and methods described can automatically detect the repeated content. Using the detection of the repeated content, a user interface can then allow a user to bypass the repeated content during playback.

20 Claims, 10 Drawing Sheets

(56) References Cited

U.S. PATENT DOCUMENTS

| | | |
|---|---|---|
| 2007/0136275 A1 | 6/2007 | Wan |
| 2008/0235191 A1 | 9/2008 | Dijk et al. |
| 2010/0007797 A1* | 1/2010 | Stojancic ............ G06F 16/7847 348/607 |
| 2011/0106656 A1* | 5/2011 | Schieffelin ......... G06Q 30/0603 705/26.9 |
| 2012/0019640 A1 | 1/2012 | Choudury |
| 2012/0110043 A1* | 5/2012 | Cavet ...................... G06F 16/48 707/825 |
| 2013/0031582 A1* | 1/2013 | Tinsman ............ H04N 21/4316 725/36 |
| 2014/0071344 A1* | 3/2014 | Francisco ............ H04N 21/242 348/500 |
| 2014/0186014 A1* | 7/2014 | Wordley ................ H04N 19/40 386/345 |
| 2015/0195626 A1 | 7/2015 | Lee et al. |
| 2015/0254344 A1* | 9/2015 | Kulkarni ............... G06F 16/951 707/747 |
| 2018/0137367 A1* | 5/2018 | Pavetic ............. G06K 9/00758 |
| 2018/0192101 A1* | 7/2018 | Bilobrov ............... G06F 16/907 |
| 2018/0293439 A1* | 10/2018 | Slesarev ............ G06K 9/00637 |
| 2018/0322192 A1* | 11/2018 | Anniballi ............ G06F 16/638 |
| 2019/0034761 A1* | 1/2019 | Huang ................. G06K 9/4628 |
| 2019/0130032 A1* | 5/2019 | Donier ................... G10L 25/30 |
| 2020/0065606 A1* | 2/2020 | Feng ...................... G06N 20/00 |
| 2020/0374596 A1* | 11/2020 | Zeiler ................ H04N 21/4828 |

* cited by examiner

AUTOMATED DETECTION OF REPEATED CONTENT WITHIN A MEDIA SERIES

BACKGROUND

Many content providers include repeated content within media items, such as television programs/series. The repeated content often includes an introduction to a television program or identifies a source identifier of the media item (e.g., a logo of a television program provider, etc.). When users consume the media item, users may desire to bypass the repeated content. This wastes time, and it may difficult for users to stop at precise location that corresponds to an end of the repeated content (e.g., an introduction to a television program) and a beginning of non-repeated content (e.g., the television program itself).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
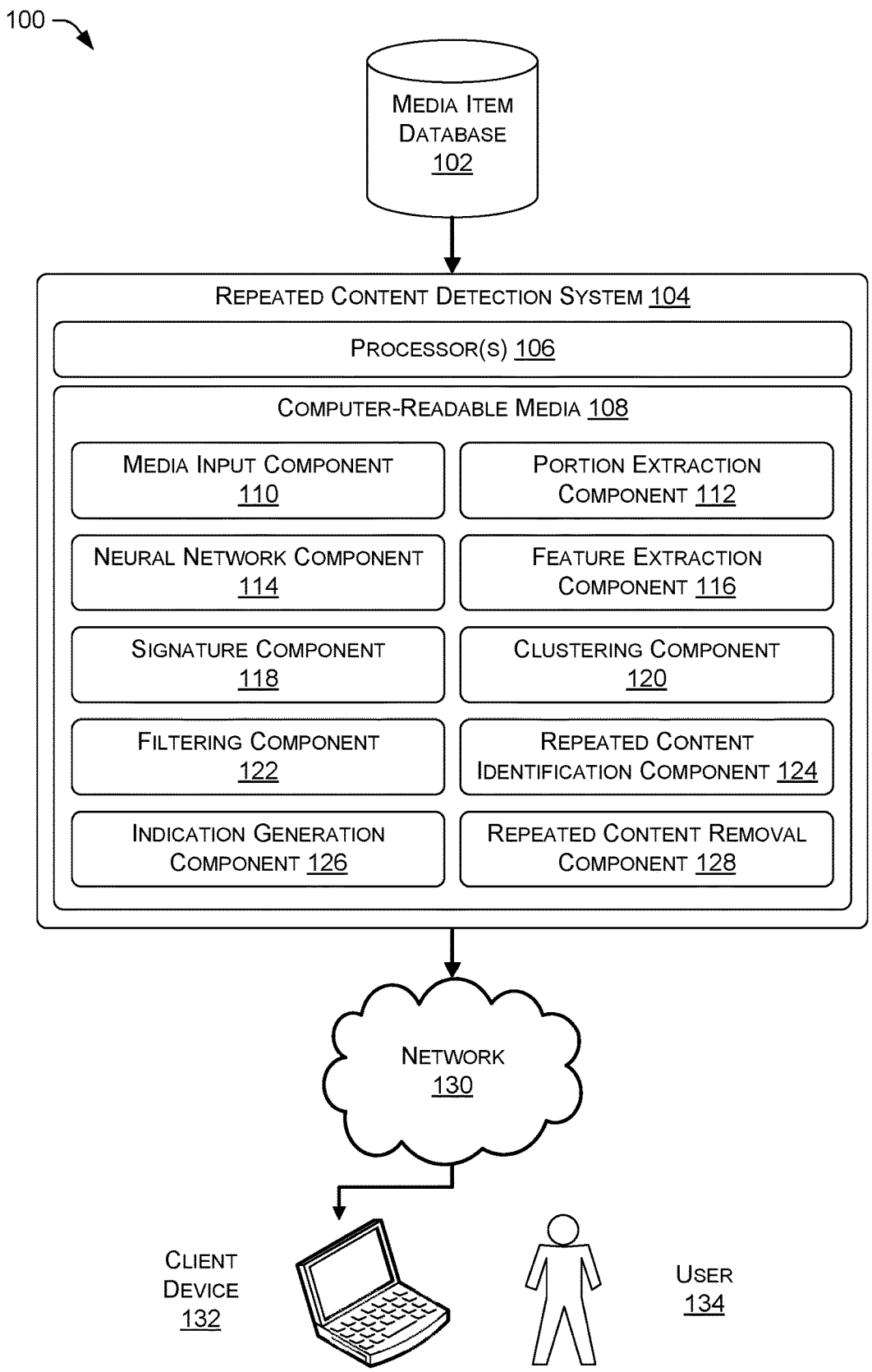
FIG. 1 is a system diagram of an illustrative environment that includes an illustrative computing architecture of a repeated content detection system.

Media items often contain repeated content that viewers may desire to bypass. In the case of a television series, the repeated content can include introductions, recaps of previous episodes, logos, source identifiers, and credits. For example, a television show may use the same introduction across many episodes of the same series. In some instances, the introduction may change, for example, from one season of the series to another. In such situations, the location, duration, etc., of the repeated content would be unique for one season of the television series. Moreover, for episodes within the same season/series of a television program, the location, duration, etc., of the repeated content may vary. For instance, a first episode in the season may have the introduction at the very beginning of that episode, whereas a second episode in the season may first include content associated with that episode and then include the introduction at a later time during the episode.

To detect the repeated content in media items, the techniques disclosed herein operate by determining portions of the media items. For example, a television show can be broken up into image frames where a single portion comprises a single image frame. Alternatively, a single portion could comprise multiple image frames. As the television show is broken up into the portions, some portions can comprise more image frames than other portions. This process of portioning can then occur across multiple media items. For instance, multiple episodes of a television series can be broken up into portions where each portion is associated with its respective episode.

Then the method can use the portions of the media items and extract features. In some instances, a neural network can be used to extract the features. For example, in the case of a television episode, portions of the television episode can comprise image frames. A deep neural network can be trained to detect and/or extract features from the image frames. As an example, an image frame can be processed as a set of pixels where each pixel is associated with a numerical pixel value. By performing operations such as addition, subtraction, division, and multiplication among pixel values, the pixels can be correlated and associated with one another to detect and extract the features.

The features can include, for example, image data, object data, text data, and/or audio data associated with the media items. After detecting and extracting the features, the features can be represented as a numerical value or a set of numerical values. In the case of an episode of a television show, a portion of the television show can be a single image frame. That portion of the television show could include a car and a building. Consequently, after undergoing feature detection and/or extraction, the car and the building can be represented as a part of the numerical value or the sequence of numerical values associated with that image frame. In the case of an audio recording, such as a podcast, a portion of the audio recording can be, for example, a five second clip of the podcast. The five second clip can include features such as spoken words, music, a combination of spoken words and music, static, background noise, or silence. After undergoing feature detection and/or extraction, those features can be represented as a numerical value or a set of numerical values associated with the five second clip.

In addition to detecting and/or extracting audio data as features, in the case of spoken words, the spoken words can be transcribed into text with the text associated with the portion of the audio recording and used as discussed below.

A signature can be generated based on the features, or a numerical value, or a set of numerical values, associated with the features. For example, in the case of a television episode, a portion of the media item (e.g., an image frame) can contain a car and a building. The car can be represented as a first numerical value and the building can be represented as a second numerical value. Then the first numerical value and the second numerical value can be used to generate the signature that is associated with the portion of the media item. In some instances, the signature can comprise a concatenation of the first numerical value and the second numerical value. In other instances, the signature can comprise a matrix structure of the first numerical value and the second numerical values. Other suitable data structures, such as data arrays, data stacks, and data trees, are contemplated for the signature.

After extracting the features, the media portions are compared with one another and clustered based on a similarity threshold or a variance threshold. For example, the signatures can provide a form of data such that similar signatures indicate a similarity in features. Therefore, in the case of a television episode, if two portions of media items have high similarity, the two portions of media items are more likely to be visually similar. After clustering the portions of the media items, the systems and methods described can detect the repeated content in the media items. In some instances, the systems and methods can detect the repeated content based on a determination of whether the media portions are sequential or nonsequential, where time data associated with the media portions can indicate whether the media portions are sequential or nonsequential. In some examples, the system can store the timestamps associated with the repeated content or provide an indication on a user interface to allow a user to bypass the repeated content. In some instances, the system can remove the repeated content from the media item or generate new media items that omit the repeated content.

FIG. 1 is a system diagram of an illustrative environment 100 that includes a media item database 102 and an illustrative computer architecture of a repeated content detection system 104. The media item database 102 can store media items including, but not limited to, television episodes, motion pictures/movies, and audio recordings, such as podcasts or audiobooks. In some instances, the media items can be a part of a regularly occurring series such as a television series or a weekly podcast. In other instances, the media items can be a part of a non-regularly occurring series such as a set of motion pictures.

As depicted in FIG. 1, the media item database 102 can connect directly to the repeated content detection system 104. In other instances, the media item database 102 can connect to the repeated content detection system 104 through one or more computing systems or a network. Additionally, in other instances, the media item database 102 can be located within the repeated content detection system 104 or the repeated content detection system 104 can be located within the media item database 102. These examples show how a variety of architectures could be used to implement these systems.

The repeated content detection system 104 can be implemented in a distributed or non-distributed computing environment. For example, some of the components can be distributed across multiple computing platforms or all of the components can be consolidated onto a single computing platform. Additionally, some of the components can be duplicated and implemented in parallel.

The repeated content detection system can include one or more processors 106 and one or more computer readable media 108 that stores various modules, applications, programs, or other data. The computer-readable media 108 can also include instructions, that when executed by the one or more processors 106, cause the processors to perform the operations described herein for the repeated content detection system 104. In some embodiments, the processor(s) 106 may include a central processing unit (CPU), a graphics processing unit (GPU), both CPU and GPU, or other processing units or components known in the art. Additionally, each of the processor(s) 106 may possess its own local memory, which also may store program modules, program data, and/or one or more operating systems.

With respect to the computer-readable media 108, embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 108 can store a media input component 110, a portion extraction component 112, a neural network component 114, a feature extraction component 116, a signature component 118, a clustering component 120, a filtering component 122, a repeated content identification component 124, an indication generation component 126, and a repeated content removal component 128.

The media item database 102 can transmit the one or more media items to the media input component 110. In this case, the media input component 110 can receive the one or more media items and continue operation based on the received one or more media items. In other instances, the media input component 110 can retrieve the one or more media items from the media item database 102. In this case, the media input component can determine which one or more media items to retrieve and continue operation based on the one or more retrieved media items. In other configurations, the repeated content detection system 104 can access the one or more media items without the media input component 110 by way of the media items stored within the computer-readable media 108 or, for example, by having the repeated content detection system 104 operating within the media item database 102.

The portion extraction component 112 can extract portions from the one or more media items. Extracting portions facilitates the process of detecting repeated content as repeated content is often a subset of the media item. For example, a television show may use the first 5% of the run time for an introduction. For purposes of illustration only, the television show can be portioned into portions of 5%, resulting in 20 portions. After performing one implementation of the techniques described herein, the systems and methods can indicate the end of the introduction at the end of the first 5% of the television show. Alternatively, the television show can be portioned into portions of 4%, resulting in 25 portions. After performing one implementation of the techniques described herein, the systems and methods can indicate the end of a portion of the introduction at the end of the first 4% of the television show and may or may not indicate the end of the first 8% of the television show depending on various settings, thresholds, and configurations. In some instances, a high level of granularity can be used while in other instances, a lower level of granularity can be used. The level of granularity can be based on, for example, the type of media item or system resources.

The portion extraction component 112 can use utilities to perform the portion extraction such as, for example, FFmpeg. Other utilities providing similar capabilities can be used. In some implementations, the portion extraction component 112 can perform the portion extraction directly by implementing segmentation algorithms and techniques.

In the case of a video type of media, the portions can include one or more frames of the video. In the case of an audio type of media, the portions can include audio clips. In the case of a mixed type (i.e., a media item including both video and audio), the portion extraction component 112 can extract the video portion, the audio portion, or both from the media item and extract portions from the extracted video portion and/or the extracted audio portion. Additionally, in some instances, the portion extraction component 112 can extract time data and associate a time with each of the extracted media portions. In other instances, the portion extraction component 112 can determine time data based on an extraction rate. For example, if portions are extracted at a rate of one frame per second of a video, the portion extraction component can determine that the fifth frame is associated with a fifth second of the video. The portion extraction component 112 can also adjust the size of the portion using, for example, a configuration setting. Therefore, in some circumstances, a single portion can include, for example, a single frame of the video or multiple frames of the video. Similarly, in other circumstances, a single portion can include, for example, a fraction of a second of audio or multiple seconds of audio. By adjusting the size of the portion, a performance of a computer can be improved by reducing an amount of data required for processing or the iterations required to process a media item. Therefore, a computing system can operate faster, more efficiently, and/or with more accuracy.

The size of the portion can also be based on the size of the media item or the type of media item. In the case of shorter videos or shorter audio recordings, the size of the portion may be smaller in order to have more granularity. The system can also adjust the size of the portions based on the location within the media item. For example, introductions typically appear near a beginning of a television program. The system can identify and extract smaller portions (e.g., portions having a shorter duration) near the beginning of the video and larger portions (e.g., portions having longer durations) in the middle or near the end of the video. Adjusting the size of the portions can occur dynamically as the system processes the media items, based on a configuration, or based on machine-learning algorithms. A performance of a computer can also be improved by dynamically adjusting the size of the portions. As a system processes a media item, dynamic adjustment can allow a computing system to operate more efficiently by processing fewer media portions and/or more accurately by concentrating on regions of a media item more likely to contain repeated content.

The neural network component 114 can include a deep neural network to operate on the portions of the media items to detect the features. For example, neural networks such as Visual Geometry Group (i.e., VGG), Residual Network (i.e., ResNet), GoogleNet, Zeiler & Fergus Net (i.e., ZFNet), and AlexNet may be used, although other suitable neural networks are also contemplated. In some instances, the neural networks can perform localization to determine a location of an object in an image and in other instances, the neural networks can perform classification to determine a type of object in the image. Through multiple layers of processing, such as convolutions layers, max pooling layers, and/or fully connected layers, the neural network can calculate a probability distribution for a given image.

The neural network component 114 can be trained to detect features from the portions of the media items. The training, for example, can include applying optimization algorithms (e.g., Gradient Descent, Stochastic Gradient Descent, or Adam) to optimize weights applied to layers within the neural network. Known inputs can be used to assist the training process. For example, an image of a chair can be used to train the neural network and the weights can be adjusted based on the probabilities associated with the classifications output by the neural network.

Features can include data such as, for example, object data, color data, text data, or data indicating a correlation between pixels. Object data can comprise, for example, objects within an image frame, such as a car or a building. Color data can comprise, the colors presented in an image frame. Text data can comprise the text associated with a portion of a media item that has been transcribed. In the case of a media portion that contains spoken words, the spoken words can be transcribed into text and the text can be represented as a feature associated with that portion of the media item. Data indication a correlation between pixels can comprise, for example, X and Y coordinates for a set of pixels and, in some instances, can be used to detect edges within an image. In other instances, the features can include audio data such as, for example, pitch and/or frequency data. In some instances, other machine learning algorithms can be used as well as statistical algorithms and probabilistic models.

The feature extraction component 116 can use the features detected by the neural network component 114 to extract the features from the portions of the media items. For example, the neural network component 114 can provide feature data associating pixels of an image frame with a feature. Using this feature data, the feature extraction component 116 can use only the pixels associated with the feature and represent the feature as a numerical value. In some instances, the feature extraction component 116 can represent the features as numerical values with a range of, for example, 0-4096. In other instances, the range may include larger and/or smaller numerical values. After extracting the features, the feature extraction component 116 can associate the extracted features with the portion of the media item. For example, the feature extraction component 116 may cause an association between the extracted features and the portion of the media item to be stored in a database, a data structure, etc. In some instances, the feature extraction component 116 can transcribe audio recordings into text and generate or determine transcriptions, possibly using one or more automated speech recognition (ASR) techniques. Then, feature extraction component 116 can extract portions of the text as the features associated with the portions of the media items.

The signature component 118 can generate a signature based on the features extracted by the feature extraction component 116. As discussed above, the features can be represented as numerical values. Using these numerical values, a signature can be generated by using, in some instances, a concatenation of the numerical values of some or all of the features in a portion of a media item. In other instances, the signature can comprise a matrix or matrices of the numerical values while other suitable structures can be used such as data arrays, data stacks, and/or data trees. The signature generated by the signature component 118 can include, in some circumstances, a list of features or a concatenated set of features. In cases where numerical values represent the features, a sequence of numerical values can represent the signature. The signature component 118 can then associate the generated signature with a portion of the media item and/or the media item. In some instances, the generated signature can represent a vector value.

The clustering component 120 can use the signatures to compare portions of media items and associate portions of media with similar signatures into clusters. The comparison can include using a nearest neighbor search such as, for example, k-nearest neighbor, approximate nearest neighbor algorithms, or exact nearest neighbor algorithms. Additionally, in some instances, the clustering component 120 can normalize the signatures prior to comparison. In particular, the clustering component 120 can use a cosine similarity function to determine a similarity between signatures. In other instances, the clustering component 120 can use a Euclidean distance or a Manhattan distance to determine a similarity between signatures. Further, in some instances, the clustering component 120 can use a difference function to determine a delta or a difference of numerical values in the signature to determine a similarity between multiple signatures. The clustering component 120 can also use a combination of methods and assign a weight to the various methods to determine a similarity between signatures.

After performing a comparison, the clustering component 120 can cluster portions of media items with a similarity above a threshold, for example a similarity threshold or a variance threshold. If a portion of a media item does not have a similarity above a threshold with another portion of a media item, the clustering component 120 can ignore the portion of the media item or it can place the portion of the media item in an individual cluster. The clustering component 120 can use a configurable threshold with any suitable range based on a percentage. The clustering component 120 can act upon portions of media items that belong either to the same media item or to different media times. For example, in the case of a television episode, the clustering component 120 can operate on a first frame and a second frame. In one instance, the first frame and the second frame are associated with a single episode. In another instance, the first frame is associated with a first episode and the second frame is associated with a second episode, where the first episode and the second episode are part of the same television series. Thus, the clustering component 120 can operate and cluster portions of media items regardless of whether the portions are associated with the same media item or different media items.

The filtering component 122 can use the clusters to determine which clusters do not likely contain repeated content. In some instances, the filtering component 122 can use time data and determine a time associated with the media portions within a cluster. As discussed above, the clustering component 120 can place portions of media items that do not have a similarity above a threshold in an individual cluster. In some instances, the filtering component can indicate that clusters with only a single portion of media can be ignored or disregarded. In other instances, the filtering component can remove or delete these clusters from the repeated content detection system 104. Additionally, the filtering component 122 can use a configurable threshold for the number of portions of media items in a cluster. For example, if the filtering component threshold is set to three or fewer, the filtering component 122 can indicate clusters that have three or fewer portions of media items to be ignored or disregarded. The filtering component threshold can also be based on a percentage of the number of media items. The filtering component 122 can also use sequential data to determine which clusters do not likely contain repeated content. For example, a set of clusters may each contain five portions of media content. The portions of media content within the set of clusters, however, may not align sequentially within the media item. For this example, the filtering component 122 would indicate that these nonsequential clusters could also be ignored or disregarded.

For purposes of illustration only, the system can process five episodes of a season of a television program. The filtering component 122 can filter out and/or disregard clusters that do not have at least one image frame from each of the five episodes. In other instances, the filtering component 122 can filter clusters that do not have at least one image frame from a threshold number of episodes. In some instances, the threshold number of episodes can be based on a percentage or a fixed number. Additionally, the filtering component 122 can filter clusters that do not have at least one image frame from any of the five episodes.

In some instances, the filtering component 122 can sequence a variety of filters. For purposes of illustration only, the filtering component 122 can first filter clusters that do not have a minimum number of image frames. Then the filtering component 122 can filter clusters that do not have at least one image frame from 80% of the media items. Then, the filtering component 122 can use time data to filter clusters that do not have image frames that are adjacent or near adjacent in time, or sequential, with other clusters. The filtering component 122 can then filter out clusters that do not have a threshold number of adjacent or near-adjacent clusters or filter out clusters that have nonsequential media portions.

The repeated content identification component 124 can use the remaining clusters after the filtering component 122 to identify repeated content. In some instances, the remaining clusters will contain portions of media items that align sequentially within the media item. The repeated content identification component 124 can then determine that the remaining clusters contain portions of media items that correspond to repeated content. The repeated content identification component 124 can also, in some circumstances, use timestamp data to indicate a beginning of the repeated content and the end of the repeated content. The repeated content identification component 124 can the store the timestamp data in the computer-readable media 108 or other storage accessible to the repeated content detection system 104. In some instances, multiple sets of clusters with sequential portions of media items can remain and the repeated content identification component 124 can identify multiple repeated contents. For example, in some circumstances, a television episode may have an introduction portion and a credits portion of the episode. The repeated content identification component 124 can determine two instances of repeated content within the media items.

In some circumstances, the repeated content identification component 124 can also identify a type of repeated content. Therefore, in some circumstances, the repeated content identification system 124 can indicate a repeated content with, for example, an introduction, a logo, a source identifier, a recap, a commercial, or a credit. Additionally, the repeated content identification system 124 can be configured to identify a source based at least in part on the repeated content. For example, the logo at the beginning of a movie could indicate a production company that produced the movie. The repeated content identification system 124 could be configured to determine that the repeated content is a logo and also determine the production company associated with the logo. As another example, the repeated content could be a sound (e.g., the THX sound effect). The repeated content identification system 125 could be configured to determine that the company and/or source of the sound is in this case THX.

The indication generation component 126 can generate an indication on a user interface corresponding to the repeated content. For example, in some instances, as a user views a television episode, the indication generation component 126 can generate an indication to the user that a repeated content will begin or has begun. In other instances, indication generation component 126 can generate an indication to the user to allow the user to skip the repeated content to resume at the end of the repeated content or near the end of the repeated content. If the user activates the indication, for example by touching or clicking on the indication, playback will continue at or near the end of the repeated content. In some instances, the indication generation component 126 can use the timestamp data from the repeated content identification component 124 to determine when to generate the indication to the user and/or when to continue playback. Further, in some instances, the indication generation component 126 can include an indication of a type of repeated content (i.e., an introduction, a logo, a source identifier, a recap, a commercial, or a credit) to the user.

The repeated content removal component 128 can remove the repeated content from the media items. In some instances, a user may prefer to consume content with all repeated content removed. The repeated content removal component 128 can remove the repeated content and generate a new media item available to a user. In other instances, the repeated content removal component can remove the repeated content from the existing media item.

While discussed in the context of multiple media items (i.e., multiple episodes of a television series or multiple audio recordings of a podcast series), the techniques described herein can also be applied to a single media item. For purposes of illustration only, a movie or a television episode can include a commercial where the commercial appears multiple times throughout the movie or episode. By using the techniques described herein, the commercial can be detected as repeated content.

Additionally, in some instances, the repeated content detection system 104 can use consumer data to detect repeated content. For illustration purposes only, the repeated content detection system 104 can collect consumer data indicating common parts of a media item that consumers skip over. Using this consumer data, the repeated content detection system 104 can build a confidence level associated with various parts of a media item. The repeated content detection system 104 can then use the confidence level in association with the techniques described herein to detect repeated content in a media item.

The repeated content detection system 104 can connect to a network 130. As discussed above, the repeated content detection system 104 can be a part of a larger system that provides additional computing resources such as, without limitation, a network interface controller. The network interface controller can interface with the network 130. In other instances, the repeated content detection system 104 can include functionality to interface with the network 130 directly.

Client device 132 shows an example of a device such as a laptop, desktop computer, tablet, phone, e-reader, network appliance, or other computing device that can connect to network 130 where user 134 can consume a media item on client device 132. While the user 134 is viewing a media item, possibly via the client device 132, the user 134 may indicate a selection to bypass or skip the repeated content that has been previously identified within that media item. For instance, the user 132 may select a button or selectable user interface element (e.g., on a remote control) to skip/bypass the repeated content.

Figure 2:
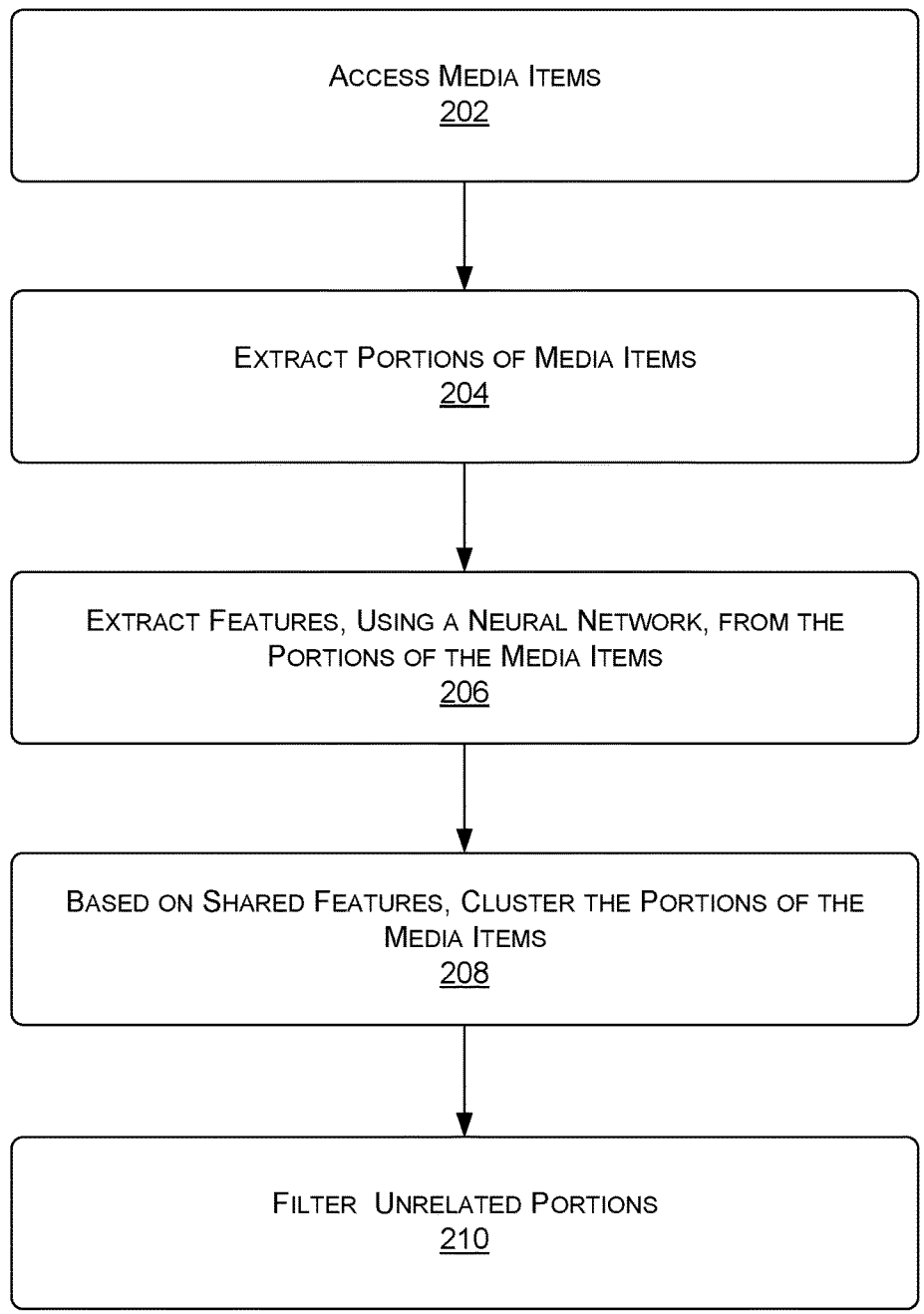
FIG. 2 is a flow diagram of an illustrative process to detect repeated content within a plurality of media items.

FIG. 2 is a flow diagram of an illustrative process 200 to filter unrelated media portions. The process 200 is described with reference to the environment 100 and the repeated content detection system 104. The process 200, however, can be performed in other similar and/or different environments.

At 202, the media input component 110 can access the media items stored in the media item database 102. As discussed above, in some embodiments, the media input component 110 can receive one or more media items. In other embodiments, the media input component 110 can retrieve the one or more media items. Further still, the media input component 110 may maintain or store the one or more media items, such as in a database, datastore, data structure, and so on.

At 204, the portion extraction component 112 can extract portions from the one or more media items. For example, the portion extraction component 112 can extract image frames from a video. In other examples, the portion extraction component 112 can extract audio clips from an audio recording.

At 206, the process 200 can use the feature extraction component 116 to extract features from the portions of the media items. As discussed above, in some embodiments, the feature extraction component can use the neural network component 114 to detect the features in the portions of the media items.

At 208, the clustering component 120 can cluster the portions of the media items based on, for example, a threshold. As discussed above, the clustering component 120 can use signatures generated by the signature component 118 to perform comparisons of portions of media items. In other instances, the clustering component 120 can compare the features of the portions of the media items without the use of the signatures.

At 210, the process 200 can use the filtering component 122 to ignore or remove clusters that do not contain a threshold number of portions of media items. Additionally, the filtering component 122 can ignore or remove clusters that do not correspond to sequential portions of media items.

FIGS. 3-6 are pictorial diagrams of an illustrative process of detecting repeated content within multiple media items. This example will step through a portion of the process by which the repeated content is detected. The order in which the operations are describes is not intended to be construed as a limitation, however.

Figure 3:
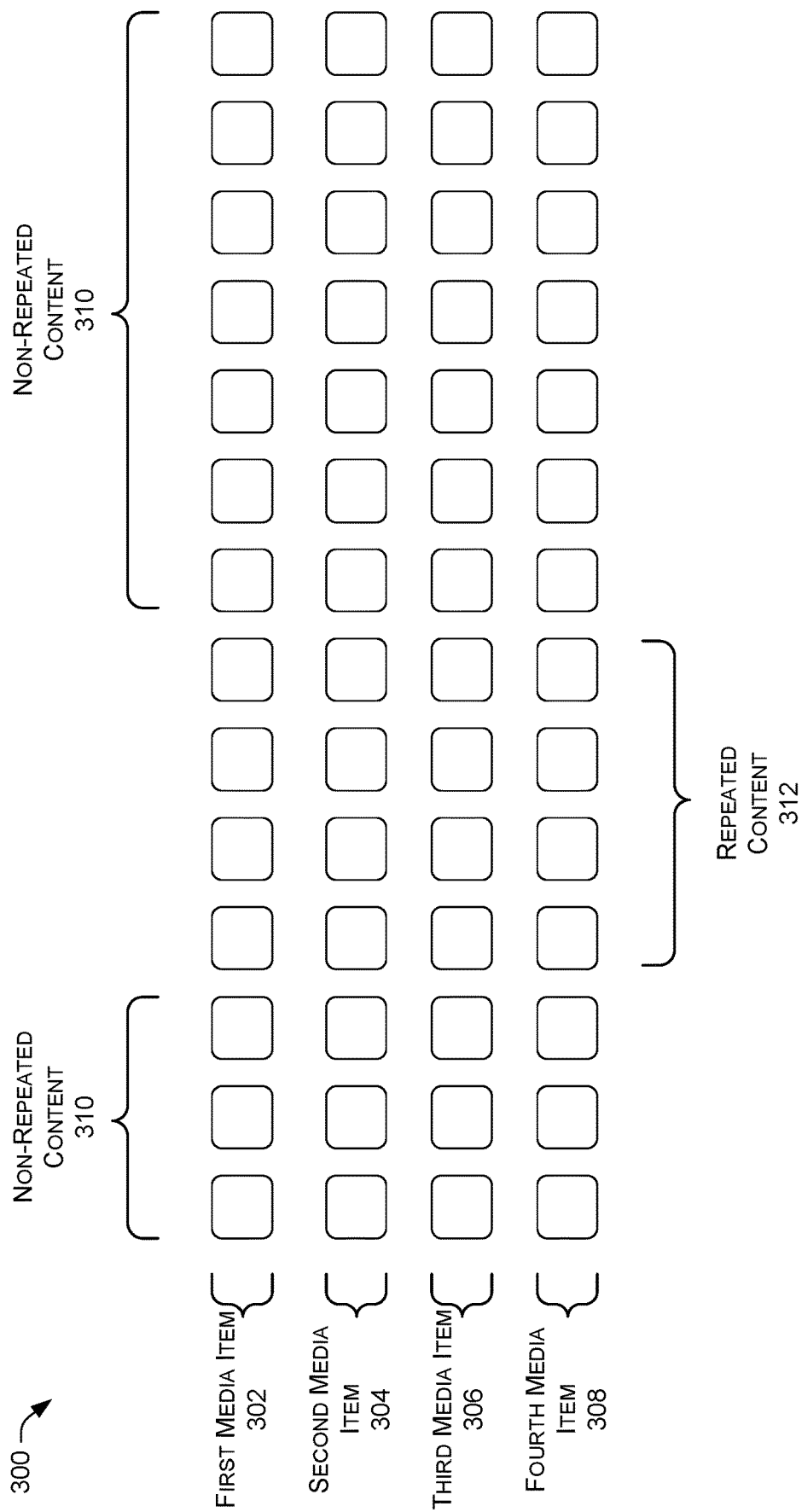
FIG. 3 is a pictorial diagram of an illustrative series of media items having repeated content and non-repeated content.

FIG. 3 is a pictorial diagram 300 of a set of media items. For example, first media item 302 can represent a first episode in a television series, second media item 304 can represent a second episode in the television series, third media item 306 can represent a third episode in the television series, and fourth media item 308 can represent a fourth episode in the television series. At this stage, the portion extraction component 112, for example, has operated on the first media item 302, the second media item 304, the third media item 306, and the fourth media item 308. Non-repeated content 310 can represent portions or image frames associated with non-repeated content within the media items and repeated content 312 can represent image frames associated with repeated content within the media items. At this stage, the process has not yet identified the repeated content 312 and the indication is provided for reference purposes.

Figure 4:
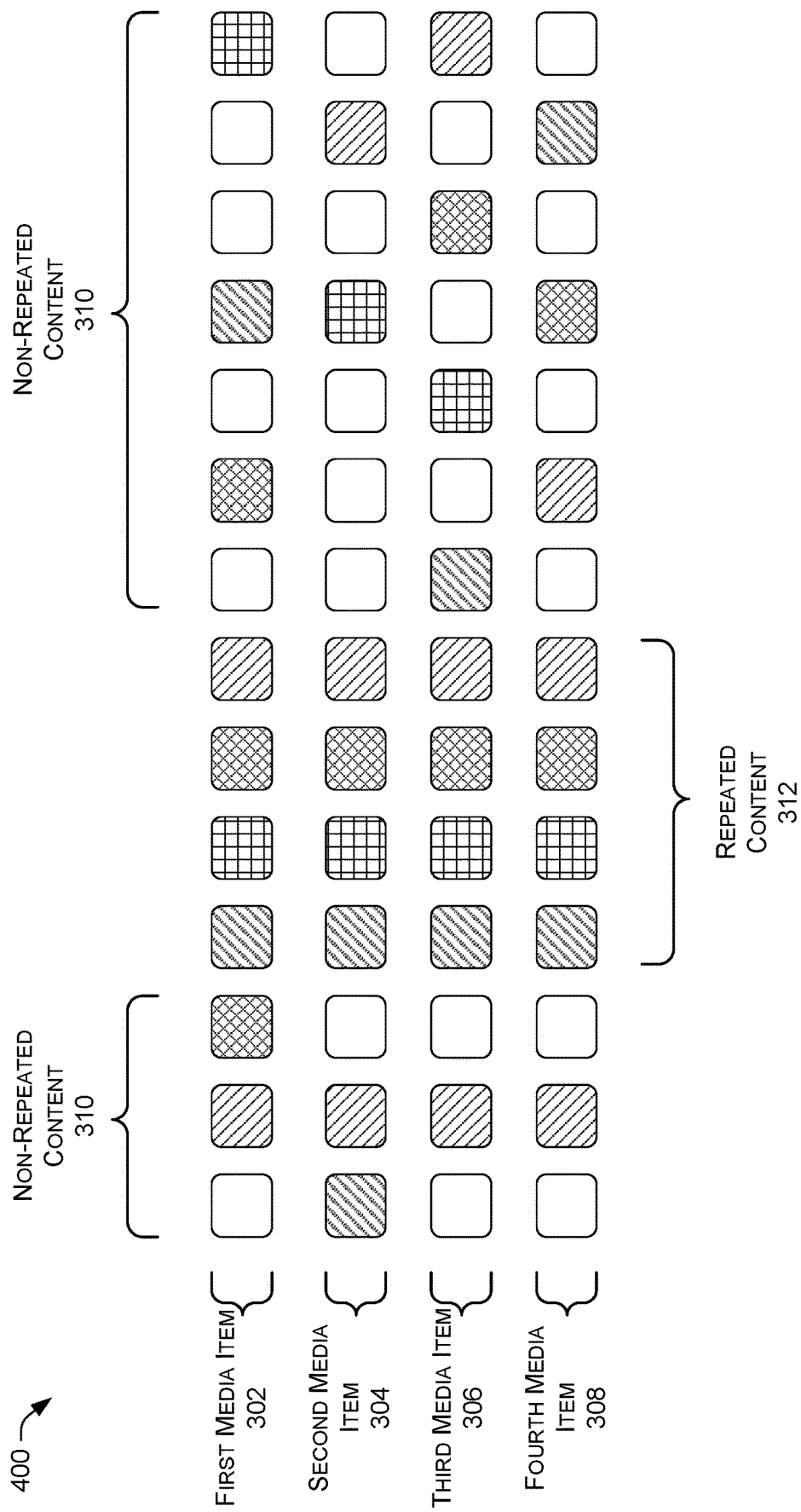
FIG. 4 is a pictorial diagram of the media items illustrated in FIG. 3 where, for illustrative purposes, features are represented as patterns and some of the portions of the media items share the features represented as patterns.

FIG. 4 is a pictorial diagram 400 of the set of media items. Here, the neural network component 114 has executed, as discussed above, to detect features in some of the image frames. Using the features detected by the neural network component 114, the feature extraction component 116 can then extract the features from the image frames and represent the features as a numerical value. Then, the signature component 118 can generate a signature based on the numerical values generated by the feature extraction component 116. For purposes of illustration only, the patterns shown in FIG. 4 represent signatures associated with an image frame. Therefore, some image frames have signatures similar to other image frames while other image frames do not have signature similar to some other image frames. Additionally, in this example, some frames do not have signatures associated with them. In this instance, it is possible that the frame did not have features detected by the neural network component 114.

Figure 5:
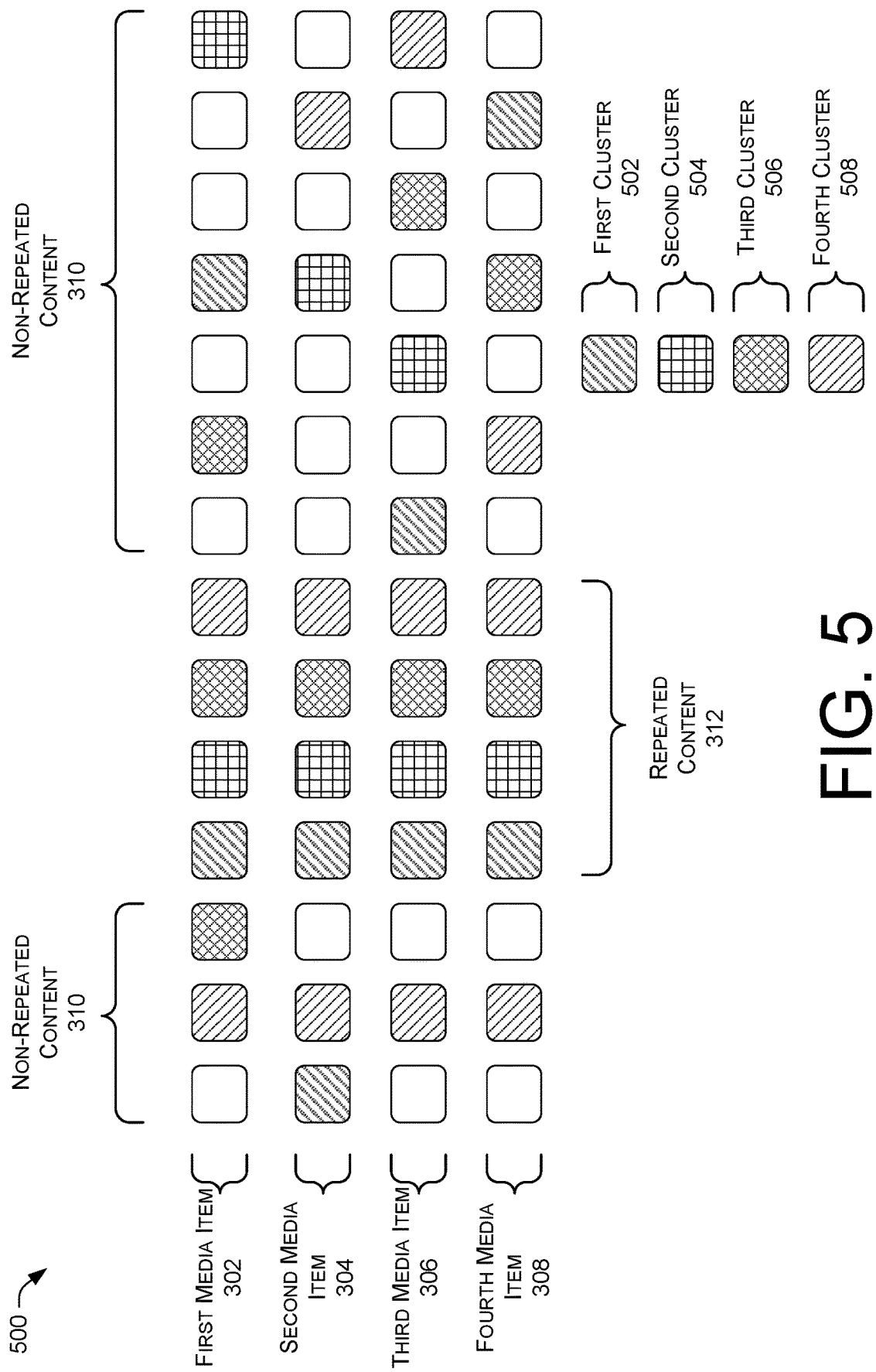
FIG. 5 is a pictorial diagram of the media items illustrated in FIGS. 3 and 4 where, for illustrative purposes, the portions of the media items that share features are associated with clusters.

FIG. 5 is a pictorial diagram 500 of the set of media items. For example, after the clustering component 120 clusters the portions of media content, based on signatures and/or features, a first cluster 502, a second cluster 504, a third cluster 506, and a fourth cluster 508 indicate which portions of the media items correspond with clusters. In this example, the clustering component 120 uses the signatures generated by the signature component 118. The clustering component 120 can begin, for example, with a first signature and compare it with a second signature. Using, for example, the techniques described above, the clustering component 120 can determine, based on the comparison, to either place the first image frame associated with the first signature in the same cluster as the second image frame associated with the second signature. This process can continue until some or all of the image frames have been clustered, such that each image frame has been placed in its own cluster or within a cluster with one or more other image frames.

Figure 6:
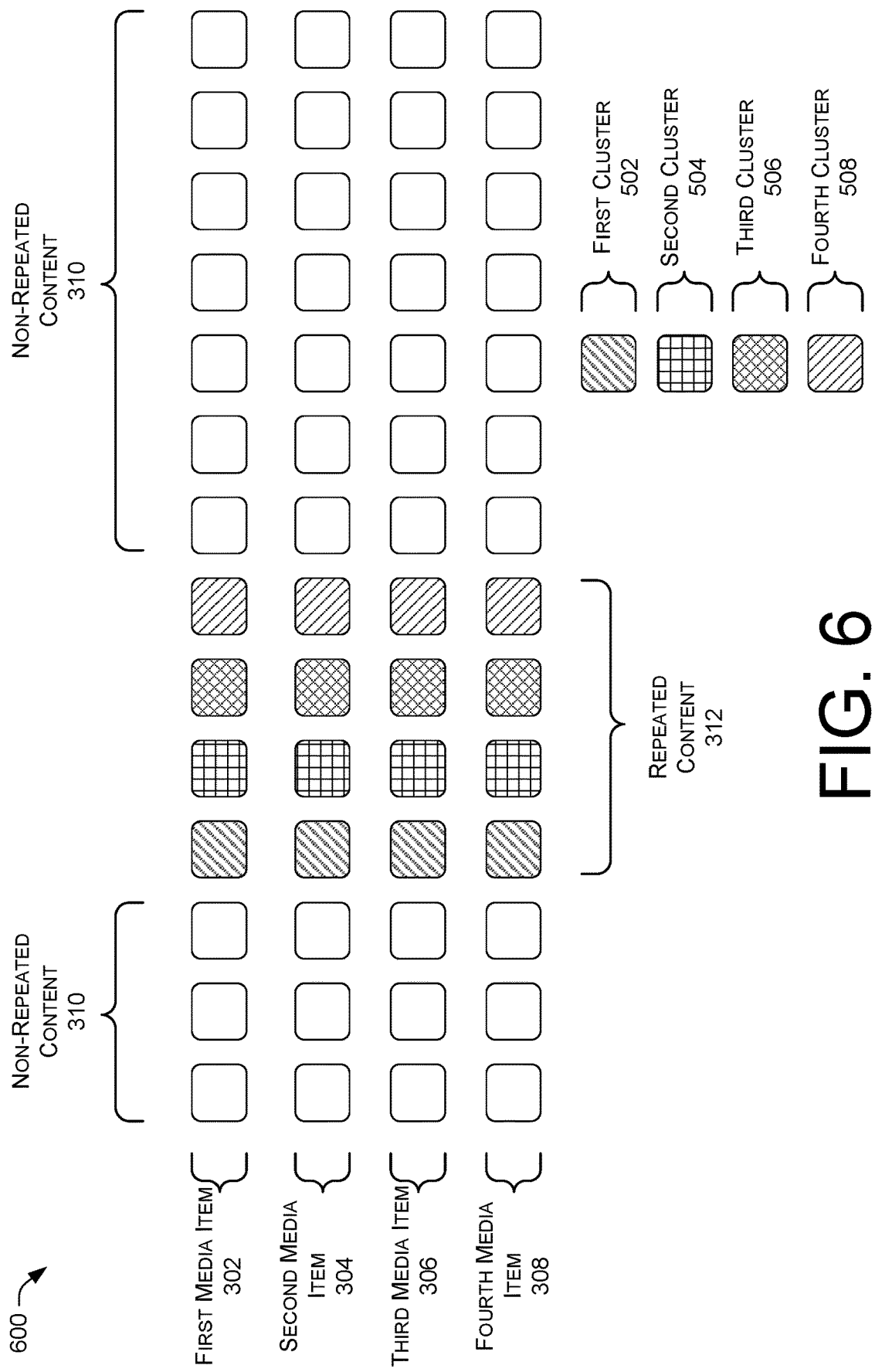
FIG. 6 is a pictorial diagram of the media items illustrated in FIGS. 3-5 where, for illustrative purposes, the portions of the media items associated with the repeated content are identified.

FIG. 6 is a pictorial diagram of the set of media items 600. For example, after the filtering component 122 has filtered out clusters that likely do not correspond to repeated content 312, the remaining clusters only contain portions of media items that contain the repeated content 312. In this example and for purposes of illustration, the filtering component 122 can filter out clusters that do not contain image frames from each of the first media item 302, the second media item 304, the third media item 306, and the fourth media item 308. Subsequently, the filtering component 122 can use time data (which indicates a location of an image frame in a media item relative to other image frames) to determine which clusters contain image frames that are adjacent or near adjacent to one another. For purposes of illustration, the clustering component 122 can operate by sequentially aligning the remaining image frames as shown in FIG. 5 according to the time data. If an image frame of the remaining image frames does not have an adjacent or near adjacent image frame, then those image frames can also be filtered out.

After the filtering component 122 has filtered out clusters that do not contain image frames from each of the media items and then has filtered out image frames within the clusters that do not have adjacent or near adjacent image frames, the remaining clusters and remaining image frames as depicted in FIG. 6 can correspond with the repeated content 312.

Figure 7:
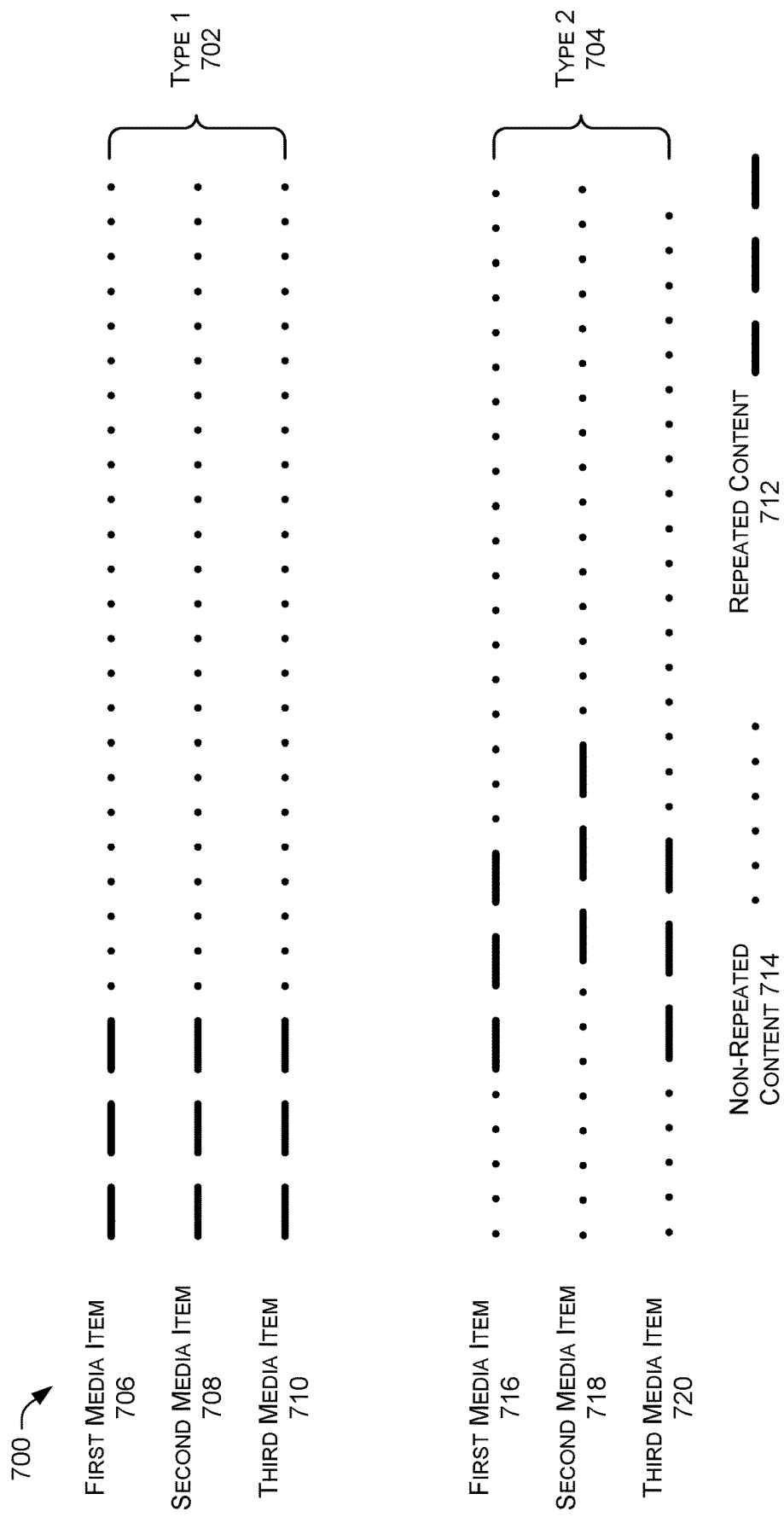
FIG. 7 is a pictorial diagram of types of arrangements of repeated content within non-repeated content.
Figure 8:
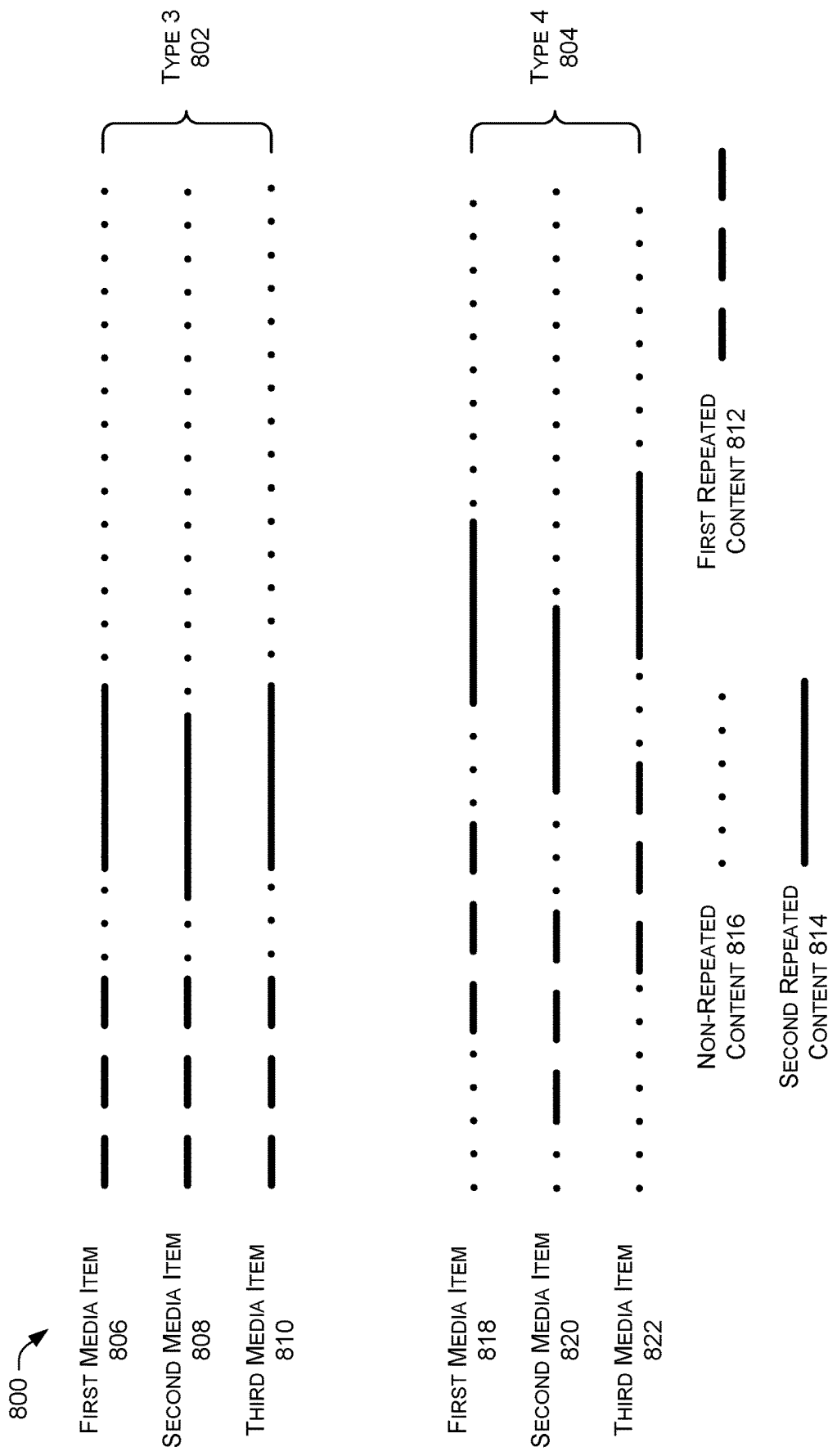
FIG. 8 is a pictorial diagram of types of arrangements of multiple repeated content within non-repeated content.
Figure 9:
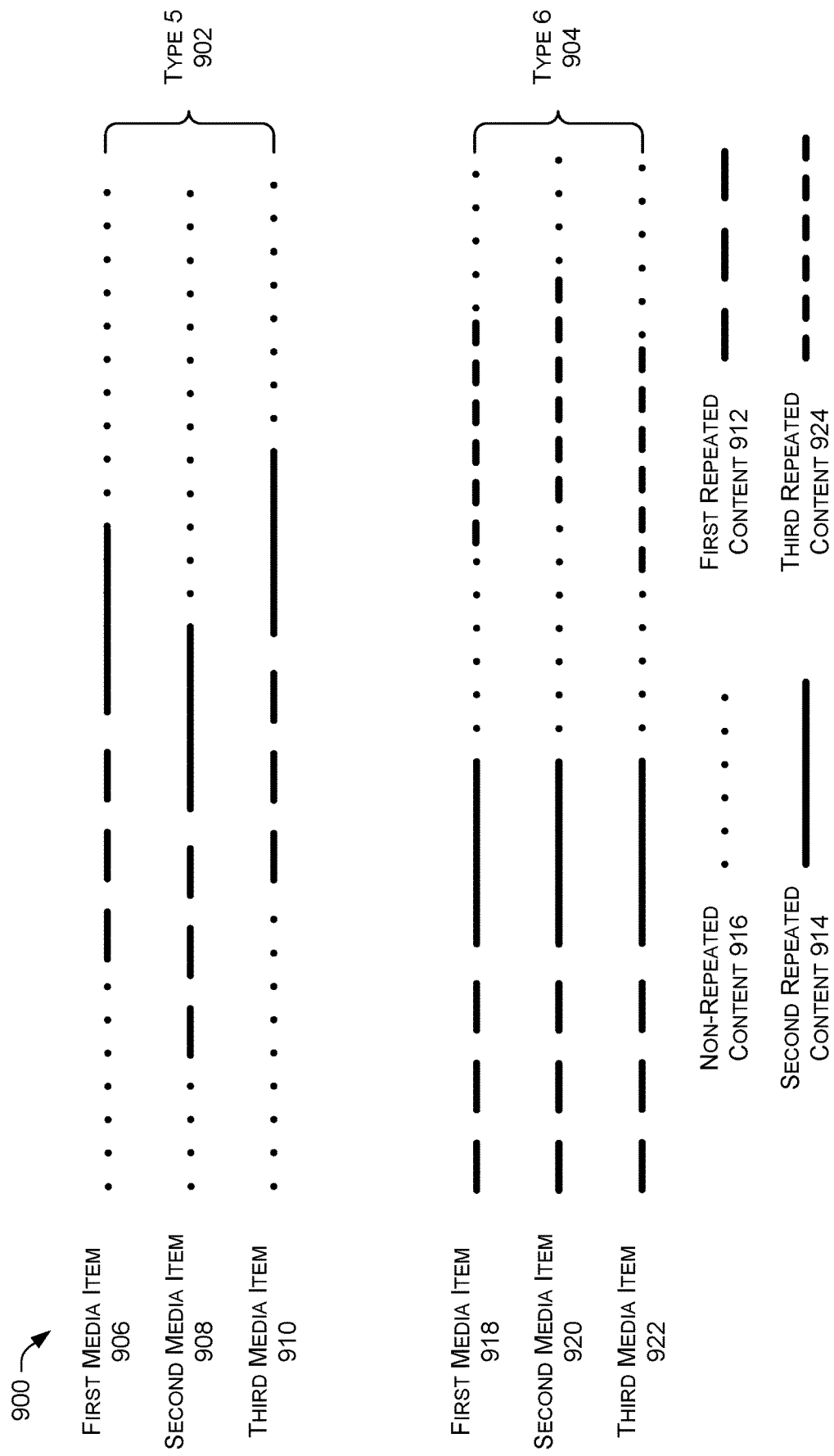
FIG. 9 is a pictorial diagram of types of arrangements of multiple repeated content within non-repeated content, where some repeated content immediately follows other repeated content.

FIGS. 7-9 are pictorial diagrams of types of media items, types of repeated content, and examples of patterns in which media items can contain multiple repeated contents.

FIG. 7 is a pictorial diagram of a type 1 702 set of media items and a type 2 704 set of media items. For example, in type 1 702, the first media item 706, the second media item 708, and the third media item 710 all contain repeated content 712 at the beginning while the non-repeated content 714 is subsequent to the repeated content 712. An example of a type 1 702 set of media items could be of an introduction placed at the beginning of a television series for every episode. Another example of a type 1 702 set of media items could be of a podcast series where an introduction song is placed at the beginning of every recording.

As another example, type 2 704 has a first media item 716, a second media item 718, and a third media item 720. Each of the first media item 716, the second media item 718, and the third media item 720 include a first portion of non-repeated content 714, followed by repeated content 712, followed by a second portion of the non-repeated content 714. Like in type 1 702, the repeated content 712 in type 2 704 could be an introduction. In this case, however, a portion of the non-repeated content 714 is before the repeated content 712. This can occur in a television show where some of the episode is played before cutting to an introduction.

As discussed above, after the signature component 118 generates signatures for the portions of media items, the clustering component 120 can use the signatures to cluster portions of the media items with similar signatures. In type 2 704, the portions of media items with similar signature do not occur at the same position among the media items 716, 718, and 720. In this case, for example, the filtering component 122 can operate by first filtering out clusters that do not contain portions of media items of every media item 716, 718, and 720. Then, the filtering component 122 can inspect the portions of media items within each cluster and filter out nonsequential portions of media items. Therefore, in cases like type 2 704 where the repeated content 712 does not appear in the position among media items 716, 718, and 720, the filtering component 122 can still operate successfully by considering whether the portions of media items are sequential rather than positioned in the media item similarly.

FIG. 8 is a pictorial diagram of a type 3 802 set of media items and a type 4 804 set of media items. Similar to type 1 702, the first media item 806, the second media item 808, and the third media item 810 all contain first repeated content 812 at the beginning of the media item. Additionally, like type 2 704, each media item of type 3 802 contains a second repeated content 814 following a portion of non-repeated content 816 that is subsequent to the first repeated content 812. A second portion of non-repeated content 816 then follows the second repeated content 814. For example, in the case of a television series, the first repeated content 812 could be a recap of a previous episode. Then the media items 806, 808, and 810 could contain content from the current episode, the non-repeated content 816. Following the non-repeated content 816, the media items 806, 808, and 810 could then contain the second repeated content 814 as an introduction to the show. Then, following the second repeated content 814, the remainder of the media items 806, 808, and 810 can contain non-repeated content 816.

Additionally, in type 4 804, the first media item 818, the second media item 820, and the third media item 822 have non-repeated content 816 preceding and following both the first repeated content 812 and the second repeated content 814. For example, the first repeated content 812 can correspond to a brief introduction and the second repeated content 814 can correspond to an extended introduction. Therefore, during playback of media items 818, 820, and 822, playback would begin with non-repeated content 816 such as a beginning of an episode of a television series. Then the first repeated content 812 could be a brief introduction such as the title of the show. Following the first repeated content 812, the show could resume and then the second repeated content 814 would occur. In this case, the second repeated content 814 could be an extended introduction that displays the characters of the show and possibly the writers and/or producers of the show. Following the second repeated content 814, the remainder of the show would begin playback.

FIG. 9 is a pictorial diagram of a type 5 902 set of media items and a type 6 904 set of media items. In type 5 902, the first media item 906, the second media item 908, and the third media item 910 contain a first repeated content 912 and a second repeated content 914. The second repeated content 914 immediately follows the first repeated content 912. A first portion of non-repeated content 916 precedes the first repeated content 912 and a second, different portion of non-repeated content 916 follows the second repeated content 914. For purposes of illustration, in audio recordings such as podcasts, episodes of the can sometimes use the same advertiser across episodes. Therefore, episodes of the podcast, media items 906, 908, and 910, can begin with the non-repeated content 916. Then the podcast can playback the first repeated content 912 which can be an introduction to the podcast such as a theme song. Then the second repeated content 914 can begin playback which can be a sponsor or advertiser of the show. After the second repeated content 914, the remainder of the podcast episode can resume.

Additionally, a type 6 904 set of media items including a first media item 918, a second media item 920, and a third media item 922. Like type 5 902, each media item contains a first repeated content 912 immediately followed by a second repeated content 914. In type 6 904, however, no non-repeated content 916 precedes the first repeated content 912 and a first portion of non-repeated content 916 follows the second repeated content 914 and a second, different portion of non-repeated content 916 follows the third repeated content 924. In some instances, the first repeated content 912 can correspond to a recap of a prior episode or a source identifier and the second repeated content 914 can correspond to an introduction. Additionally, the third repeated content 924 can, for example, correspond to a credit with the second portion of non-repeated content 916 being subsequent to the third repeated content 924. The remaining non-repeated content 916 after the third repeated content 924 can, in some instances, be referred to as an after-credit scene.

Figure 10:
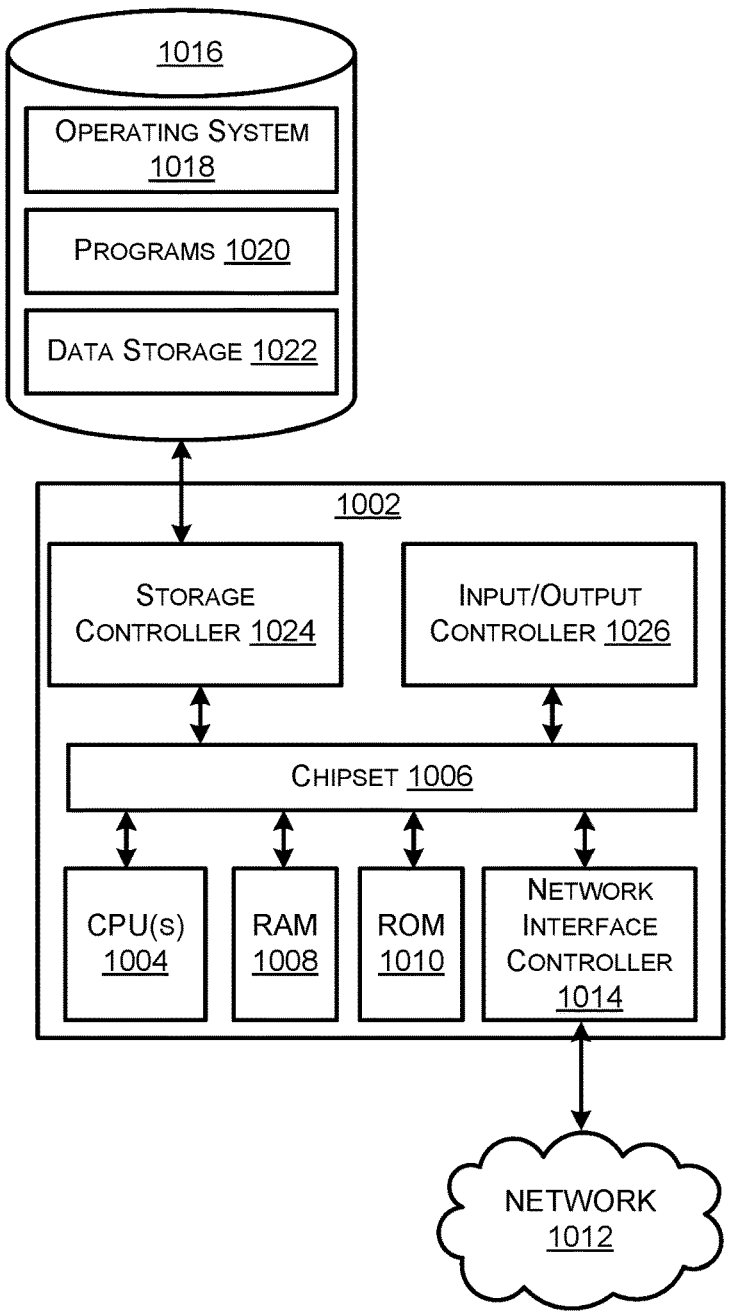
FIG. 10 is a computer architecture diagram showing an illustrative computer hardware architecture for implementing a computing device that can be utilized to implement aspects of the various technologies presented herein.

FIG. 10 is an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, wearable, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1216 that provides non-volatile storage for the computer. The mass storage device 1216 can store an operating system 1018, programs 1020, and data storage 1022, which have been described in greater detail herein. The mass storage device 1016 can be connected to the computer 1000 through a storage controller 1024 connected to the chipset 1006. The mass storage device 1016 can consist of one or more physical storage units. The storage controller 1024 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1026 for receiving and processing input from a number of input devices, such as a keyboard, a mouse, a touchpad, a touch screen, an electronic stylus, or other type of input device. Similarly, an input/output controller 1026 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   one or more computer-readable media storing computer-executable instructions that, when executed, cause the one or more processors to perform operations comprising:
   receiving, from a database that stores episodes of television programs, a first episode and a second episode of a television series;
   extracting, from the first episode and the second episode, a plurality of image frames;
   extracting, using a neural network and from the plurality of image frames, a plurality of image features, the plurality of image features comprising color data and object data associated with the plurality of image frames;
   generating, based on a concatenation of a set of image features associated with an individual image frame of the plurality of image frames, a plurality of signatures, each signature of the plurality of signatures being associated with the individual image frame;
   comparing, based on a similarity threshold, individual signatures of the plurality of signatures to generate a plurality of clusters, wherein each cluster of the plurality of clusters is associated with at least one image frame of the plurality of image frames; and
   identifying, based on the plurality of clusters, repeated content within the first episode and the second episode.

2. The system as recited in claim 1, wherein identifying the repeated content comprises identifying clusters of the plurality of clusters that are associated with more than one image frame and identifying sequential image frames among the clusters.

3. The system as recited in claim 1, wherein identifying the repeated content comprises filtering out clusters of the plurality of clusters associated with nonsequential image frames.

4. The system as recited in claim 1, wherein the individual signatures comprises a vector value and wherein comparing the individual signatures comprises using at least one of a cosine similarity, a Euclidean distance, a Manhattan distance, or a difference in numerical values.

5. The system as recited in claim 1, wherein the operations further comprise:
extracting, from the first episode and the second episode, a plurality of time data, each time data of the plurality of time data associated with one of the plurality of image frames;
determining, based on a first time data associated with a first image frame of the repeated content, a beginning timestamp; and
determining, based on a second time data associated with a second image frame of the repeated content, an ending timestamp.

6. A method comprising:
determining, from a plurality of media items, a first media portion and a second media portion;
determining, from the first media portion and the second media portion, one or more content features;
based at least in part on the one or more content features, determining one or more signatures, wherein an individual signature of the one or more signatures is associated with an individual media portion of the first media portion and the second media portion;
based at least in part on the one or more signatures, determining one or more clusters of individual media portions of the first media portion and the second media portion, wherein the one or more clusters comprise at least one of the first media portion or the second media portion;
based at least in part on the one or more clusters, identifying repeated content within the plurality of media items;
generating an indication on a user interface that is associated with a beginning portion of the repeated content; and
based at least in part on a user selection of the indication, advancing playback to an ending portion of the repeated content.

7. The method as recited in claim 6, wherein the plurality of media items comprise television episodes, motion pictures, or audio recordings.

8. The method as recited in claim 6, wherein determining the one or more content features comprises using a neural network trained to detect the one or more content features in the first media portion and the second media portion, an individual content feature of the one or more content features comprising at least one of image data, object data, text data, or audio data associated with the media portion.

9. The method as recited in claim 6, wherein identifying the repeated content comprises identifying at least one of an introduction, a logo, a source identifier, a recap, a commercial, or a credit.

10. The method as recited in claim 6, wherein the plurality of media items are a first plurality of media items, the method further comprising:
removing the repeated content from the first plurality of media items to generate a second plurality of media items without the repeated content.

11. The method as recited in claim 6, wherein the plurality of media items are associated with a series of media items, the method further comprising:
based at least in part on the first media portion and the second media portion, determining one or more transcriptions, wherein individual transcriptions of the one or more transcriptions are associated with the first media portion and the second media portion; and
wherein determining the one or more signatures is further based at least in part on the one or more transcriptions.

12. The method as recited in claim 6, wherein identifying the repeated content comprises identifying clusters of the one or more clusters that are associated with more than one image frame and identifying sequential image frames among the one or more clusters.

13. The method as recited in claim 6, wherein identifying the repeated content comprises filtering out nonsequential media portions within a cluster of the one or more clusters.

14. A system comprising:
one or more processors; and
one or more computer-readable media storing computer-executable instructions that, when executed, cause the one or more processors to perform operations comprising:
determine, from a first media item and a second media item, a first media portion and a second media portion;
determine, from the first media portion and the second media portion, one or more features;
based at least in part on the one or more features, determine one or more clusters, wherein an individual cluster of the one or more clusters comprises at least one of the first media portion or the second media portion; and
based at least in part on the one or more clusters, identify a repeated content within the first media item and the second media item,
wherein identifying the repeated content comprises filtering out nonsequential media portions within a cluster of the one or more of clusters.

15. The system as recited in claim 14, wherein identifying the repeated content comprises identifying clusters of the one or more of clusters associated with sequential media portions.

16. The system as recited in claim 14, wherein determining the one or more features comprises using a neural network trained to detect the one or more features, an individual feature of the one or more features comprising at least one of image data, object data, text data, or audio data associated with the first media portion or the second media portion.

17. The system as recited in claim 14, wherein identifying the repeated content comprises identifying at least one of an introduction, a logo, a source identifier, a recap, a commercial, or a credit.

18. The system as recited in claim 14, wherein the operations further comprise:
generate an indication on a user interface, the indication associated with a beginning portion of the repeated content; and
based at least in part on a user selecting the indication, advance playback to an ending portion of the repeated content.

19. The system as recited in claim 14, wherein the operations further comprise:
remove the repeated content from the first media item and the second media item to generate a first modified version of the first media item and a second modified version of the second media item without the repeated content.

20. The system as recited in claim 14, wherein the first media item and the second media item are associated with a series of media items, the operations further comprising:
based at least in part on the first media portion and the second media portion, determining one or more transcriptions, wherein individual transcriptions of the one or more transcriptions are associated with the first media portion and the second media portion.

\* \* \* \* \*